US006372375B1

(12) United States Patent
Lawless

(10) Patent No.: US 6,372,375 B1
(45) Date of Patent: Apr. 16, 2002

(54) CERAMIC FUEL CELL

(75) Inventor: William Nicholas Lawless, Westerville, OH (US)

(73) Assignee: CeramPhysics, Inc., Westerville, OH (US)

( * ) Notice: Subject to any disclaimer, the term of this patent is extended or adjusted under 35 U.S.C. 154(b) by 0 days.

(21) Appl. No.: 09/329,413

(22) Filed: Jun. 10, 1999

Related U.S. Application Data

(60) Provisional application No. 60/089,169, filed on Jun. 12, 1998.

(51) Int. Cl.[7] .................. H01M 8/12; H01M 8/10; H01M 4/86
(52) U.S. Cl. ................... 429/40; 429/33; 429/34; 429/35; 429/41
(58) Field of Search ..................... 429/33–41

(56) References Cited

U.S. PATENT DOCUMENTS

| | | | | |
|---|---|---|---|---|
| 3,400,054 | A | 9/1968 | Ruka et al. | 429/33 |
| 4,195,119 | A | 3/1980 | Kummer | 429/38 |
| 4,231,231 | A | 11/1980 | Lawless | 62/514 R |
| 4,296,147 | A | 10/1981 | Lawless | 427/120 |
| 4,296,607 | A | 10/1981 | Lawless | 62/6 |
| 4,296,608 | A | 10/1981 | Lawless | 62/6 |
| 4,354,355 | A | 10/1982 | Lawless | 62/6 |
| 4,356,235 | A | 10/1982 | Lawless | 428/379 |
| 4,396,721 | A | 8/1983 | Lawless | 501/10 |
| 4,404,267 | A | * 9/1983 | Iacovangelo et al. | 429/41 |
| 4,462,891 | A | 7/1984 | Lawless | 204/427 |
| 4,515,534 | A | 5/1985 | Lawless et al. | 417/322 |
| 4,545,254 | A | 10/1985 | Lawless et al. | 73/714 |
| 4,547,277 | A | 10/1985 | Lawless et al. | 204/252 |
| 4,599,677 | A | 7/1986 | Lawless et al. | 361/321 |
| 4,684,207 | A | 8/1987 | Lawless | 350/96.14 |
| 4,918,421 | A | 4/1990 | Lawless et al. | 338/21 |
| 5,009,763 | A | 4/1991 | Hise | 204/255 |
| 5,034,023 | A | 7/1991 | Thompson | 55/2 |

(List continued on next page.)

OTHER PUBLICATIONS

Solid State Fuel Cells, "Characterization and development of a new ceramic electrolyte for fuel cell appliations,"No. XP–002120860, 1991, USA.

Primary Examiner—Mark F. Huff
Assistant Examiner—Daborah Chacko-Davis
(74) Attorney, Agent, or Firm—Killworth, Gottman, Hagan & Schaeff, L.L.P.

(57) ABSTRACT

A honeycomb ceramic fuel cell is provided including, among other things, (i) an yttria stabilized bismuth oxide oxygen ion conductive ceramic with zirconia incorporated therein, (ii) a niobia stabilized bismuth oxide oxygen ion conductive ceramic, (iii) a copper cermet anode electrode disposed in the fuel supply passage of a bismuth oxide ceramic fuel cell, or (iv) specially arranged inter-passage channels formed in the ceramic body of the fuel cell. In accordance with one embodiment of the present invention, a ceramic fuel cell is provided comprising an oxidant supply passage, a cathode electrode disposed in the oxidant supply passage, a fuel supply passage, an anode electrode disposed in the fuel supply passage, and a stabilized bismuth oxide oxygen ion conductive ceramic interposed between the cathode electrode and the anode electrode. The ceramic may be stabilized with yttria or niobia and may include zirconia. Fuel cells incorporating the ceramic compositions of the present invention are operational at temperatures at or below about 650° C. Thus, sooting of the ceramic body is not a problem if unreformed organic fuels are utilized in the present invention. According to certain embodiments of the present invention, a zirconia coating is interposed between the stabilized ceramic body and the anode electrode. Further, the ceramic electrodes of the present invention may be provided with a silver overlay.

43 Claims, 4 Drawing Sheets

U.S. PATENT DOCUMENTS

| | | | |
|---|---|---|---|
| 5,062,911 A | 11/1991 | Hampton et al. | 156/89 |
| 5,183,965 A | 2/1993 | Lawless | 174/15.5 |
| 5,205,990 A | 4/1993 | Lawless | 422/121 |
| 5,212,013 A | 5/1993 | Gupta et al. | 428/381 |
| 5,222,713 A | 6/1993 | Lawless et al. | 251/129.06 |
| 5,246,729 A | 9/1993 | Gupta et al. | 427/62 |
| 5,273,628 A * | 12/1993 | Liu et al. | 429/33 |
| 5,302,258 A | 4/1994 | Renlund et al. | 205/634 |
| 5,385,874 A | 1/1995 | Renlund et al. | 501/103 |
| 5,478,662 A * | 12/1995 | Strasser | 429/13 |
| 5,536,378 A | 7/1996 | Gibson et al. | 204/234 |
| 5,712,055 A | 1/1998 | Khandkar et al. | 429/31 |
| 5,731,097 A | 3/1998 | Miyashita et al. | 429/30 |
| 5,786,105 A * | 7/1998 | Matsushima et al. | 429/34 |
| 5,807,642 A | 9/1998 | Xue et al. | 429/33 |
| 5,905,000 A | 5/1999 | Yadav et al. | 429/33 |
| 6,033,457 A | 3/2000 | Lawless | 95/4 |

* cited by examiner

CERAMIC FUEL CELL

CROSS-REFERENCE TO RELATED APPLICATIONS

This patent application claims the benefit of U.S. Provisional Application Serial No. 60/089,169 filed Jun. 12, 1998.

The present application is related to the following copending U.S. patent applications: application Ser. No. 08/926,366 for TOP-MILLED CHANNELING FOR REMOVAL OF OXYGEN FROM AN OXYGEN GENERATOR, filed Sep. 9, 1997; and application Ser. No. 08/986,161 for ELECTRODE COMPOSITION AND APPLICATION METHOD FOR OXYGEN GENERATORS, filed Dec. 5, 1997).

BACKGROUND OF THE INVENTION

The present invention relates to fuel cells and, more particularly, to ceramic honeycomb fuel cells including an oxygen ion conducting ceramic interposed between an oxidant supply cathode electrode and a fuel supply anode electrode.

Solid electrolyte fuel cells include a solid electrolyte that is oxygen-ion conductive. A porous cathode electrode and a porous anode electrode are formed on opposite sides of the electrolyte. An oxidant, e.g., oxygen gas or air, is introduced into an oxidant supply passage on the cathode side of the electrolyte. A fuel, e.g., hydrogen gas or natural gas, is introduced into a fuel supply passage on the anode side of the electrolyte. Oxygen molecules in the oxidant supply passage dissociate at the cathode electrode and absorb electrons to form oxygen ions. These ions then diffuse through the ionic conductor to the anode electrode, leaving the cathode entry surface with a deficiency of electrons. Oxygen ions leaving the anode electrode must give up electrons to form molecular oxygen, thus leaving the anode exit surface with an excess of electrons. In this manner, the fuel cell utilizes the oxygen ion conductivity of the electrolyte to function as an electrical current source.

Many fuel cells must be operated at temperatures above 800° C. and as high as 1000° C. Natural gas and methane tend to cause sooting within the fuel supply passages at these elevated temperatures. As a result, it is often necessary to reform the natural gas into a substantially pure hydrogen gas prior to introducing it into the fuel supply passages. Accordingly, there is a need for a fuel cell that is not susceptible to sooting and does not require reformation of a natural gas supply.

There is also a continuing drive to decrease production costs and increase efficiency of the above-described fuel cells through optimal selection of cathode electrode, anode electrode, and electrolyte materials or arrangements. For example, U.S. Pat. No. 5,807,642 (Xue et al.) teaches a barium strontium titanate ceramic body including material additives that serve as modifiers of the coefficient of thermal expansion or as sintering processing aids. U.S. Pat. No. 5,731,097 (Miyashita et al.) relates to a solid-electrolyte fuel cell including first and second oxygen ion conductive films stuck together and arranged in descending order, toward the anode, by oxygen ion activation energy. U.S. Pat. No. 5,712,055 (Khandkar et al.) teaches a multi-stage arrangement for the electrolyte material in a fuel cell. The disclosures of each of these patent references are incorporated herein by reference. Although each of the above-mentioned schemes, like other conventional fuel cell schemes, purport to present an optimal fuel cell arrangement, there still exists a need in the art for an improved fuel cell arrangement.

BRIEF SUMMARY OF THE INVENTION

This need is met by the present invention wherein a ceramic fuel cell is provided including, among other things, (i) an yttria stabilized bismuth oxide oxygen ion conductive ceramic including $ZrO_2$, (ii) a niobia stabilized bismuth oxide oxygen ion conductive ceramic, (iii) a copper cermet anode electrode disposed in the fuel supply passage of a bismuth oxide ceramic fuel cell, or (iv) specially arranged inter-passage channels formed in the ceramic body of the fuel cell.

In accordance with one embodiment of the present invention, a ceramic fuel cell is provided comprising an oxidant supply passage, a cathode electrode disposed in the oxidant supply passage, a fuel supply passage, an anode electrode disposed in the fuel supply passage, an yttria stabilized bismuth oxide oxygen ion conductive ceramic interposed between the cathode electrode and the anode electrode. The ceramic includes $ZrO_2$. A zirconia coating may be interposed between the yttria stabilized ceramic and the anode electrode. The yttria stabilized ceramic preferably comprises x mole % $Bi_2O_3$, y mole % $Y_2O_3$, and z mole % $ZrO_2$, wherein x is a value from about 70 to about 80, y is a value from about 20 to about 30, and z is a value from about 1 to about 5.

In accordance with another embodiment of the present invention, a ceramic fuel cell is provided comprising an oxidant supply passage, a cathode electrode disposed in the oxidant supply passage, a fuel supply passage, an anode electrode disposed in the fuel supply passage, and a niobia stabilized bismuth oxide oxygen ion conductive ceramic interposed between the cathode electrode and the anode electrode. The niobia stabilized ceramic preferably comprises x mole % $Bi_2O_3$ and y mole % $Nb_2O_5$, wherein x is a value from about 80 to about 90, and wherein y is a value from about 10 to about 20.

Preferably, either the cathode electrode, the anode electrode, or both comprise a ceramic electrode. The ceramic electrode material may be characterized by the ceramic composition LXM, where L is lanthanum (La), M is manganate ($MnO_3$), and X is lead (Pb). A silver layer may be disposed over the ceramic electrode material and may comprise a glass mixed therein, wherein the glass is selected so as to enhance adhesion of the silver layer to the ceramic electrode material.

In some embodiments of the present invention, the anode electrode comprises a copper cermet. The copper cermet may comprise a mixture of powders of CuO and a bismuth oxide ceramic. The bismuth oxide ceramic may comprise a niobia stabilized bismuth oxide oxygen ion conductive ceramic.

The oxygen ion conductive ceramic may be arranged to define a plurality of oxidant supply passages and a plurality of fuel supply passages. The oxidant supply passages may be oriented substantially parallel to the fuel supply passages and selected ones of the oxidant supply passages are preferably defined so as to be adjacent to corresponding ones of the fuel supply passages. More specifically, the oxygen ion conductive ceramic may be arranged to define a plurality of substantially parallel longitudinal channels and selected ones of the longitudinal channels may define the oxidant supply passages and remaining ones of the longitudinal channels define the fuel supply passages.

Further, the oxygen ion conductive ceramic body defining the oxidant supply passage and the fuel supply passage may be in the form of first and second sets of substantially parallel passages, wherein (i) each of the passages defines opposite passage ends, (ii) the opposite ends of the first set of passages are open, (iii) the opposite ends of the second set of passages are closed, (iv) the second set of passages include inter-passage channels formed in the ceramic body between adjacent ones of the second set of passages, and (v) the inter-passage channels are arranged proximate selected ones of the opposite passage ends. An input port and an output port may be coupled to the second set of passages, wherein the second set of passages, the input port, the output port, and the inter-passage channels are arranged to define a flow path extending from the input port, through the second set of passages and the inter-passage channels, to the output port. The inter-passage channels are preferably defined at opposite end faces of the ceramic body.

In accordance with yet another embodiment of the present invention, a ceramic fuel cell is provided comprising an oxidant supply passage, a cathode electrode disposed in the oxidant supply passage, a fuel supply passage, a copper cermet anode electrode disposed in the fuel supply passage, and a bismuth oxide oxygen ion conductive ceramic interposed between the cathode electrode and the anode electrode. The copper cermet anode electrode preferably comprises a mixture of powders of CuO and a bismuth oxide ceramic.

In accordance with yet another embodiment of the present invention, a ceramic fuel cell is provided comprising an oxygen ion conductive ceramic body defining first and second sets of substantially parallel passages, wherein (i) each of the passages define opposite passage ends, (ii) the opposite ends of the first set of passages are open, (iii) the opposite ends of the second set of passages are closed, (iv) the second set of passages include inter-passage channels formed in the ceramic body between adjacent ones of the second set of passages, and (v) the inter-passage channels are arranged proximate selected ones of the opposite passage ends. Respective first electrodes are disposed in the first set of passages and respective second electrodes are disposed in the second set of passages. An input port and an output port are coupled to the second set of passages. The second set of passages, the input port, the output port, and the inter-passage channels are arranged to define a flow path extending from the input port, through the second set of passages and the interpassage channels, to the output port. Preferably, the input port is coupled to a fuel supply and the first set of passages are coupled to an oxidant supply such that the respective first electrodes comprise cathode electrodes and the respective second electrodes comprise anode electrodes. Alternatively, the input port may be coupled to an oxidant supply and the first set of passages may be coupled to a fuel supply such that the respective first electrodes comprise anode electrodes and the respective second electrodes comprise cathode electrodes.

The fuel cell may further comprise a manifold assembly defining: (i) an input manifold coupled to a first end face of the ceramic body, wherein the input manifold defines a first manifold input in communication with the first set of passages; (ii) an output manifold coupled to an opposite end face of the ceramic body, wherein the output manifold defines a first manifold output in communication with the first set of passages; (iii) and a side face manifold coupled to opposite side faces of the ceramic body, wherein the side face manifold defines a second manifold input in communication with the input port and a second manifold output in communication with the output port. The side face manifold and the output manifold may comprise a unitary manifold assembly.

Accordingly, it is an object of the present invention to provide a ceramic fuel cell that is less expensive to produce and that embodies improved operating characteristics. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
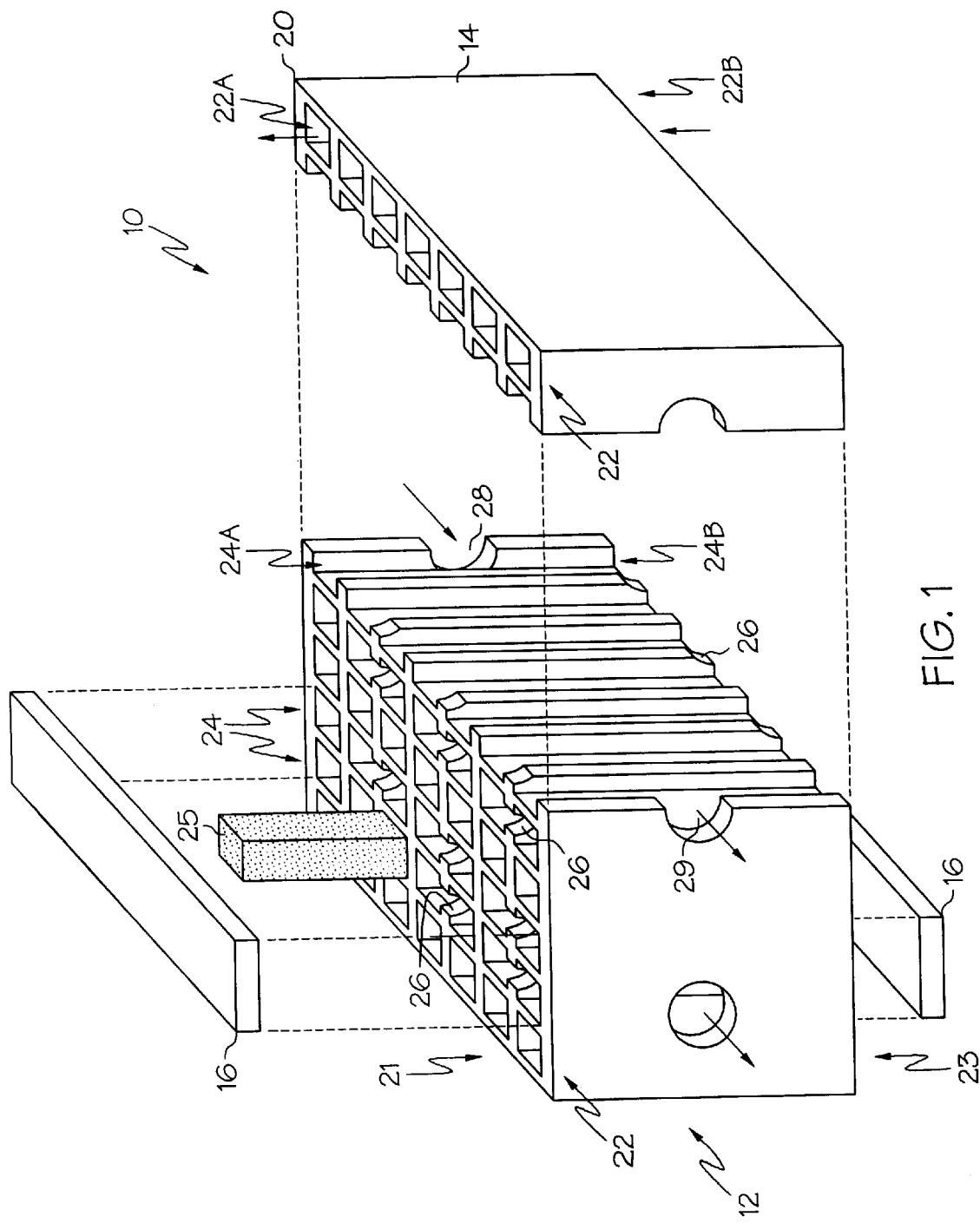
FIG. 1 is a schematic three-dimensional view of selected portions of a ceramic fuel cell according to the present invention.

A ceramic fuel cell 10 according to the present invention is illustrated in FIGS. 1–4. The ceramic fuel cell 10 comprises an extruded multicellular ceramic structure, which may also be referred to as a honeycomb ceramic body 20. The body 20 is formed from an oxygen ion conductive ceramic and defines a first set of passages 22 and a second set of passages 24 substantially parallel to the first set of passages 22. In FIG. 1, the first set of passages 22 are positioned at opposite side faces 12, 14 of the ceramic body 20 and alternate with adjacent pairs of second passages 24 between the side faces 12,14. Each of the passages within the respective sets of passages 22, 24 define opposite passage ends. The opposite ends 22A, 22B of the first set of passages 22 are open. The opposite ends 24A, 24B of the second set of passages 24 are closed with sealing members or end plates 16 (only two of which are shown in FIG. 1). However, the second set of passages 24 include inter-passage channels 26 and are coupled to an input port 28 and an output port 29 formed in the ceramic body 20. As will be appreciated by those practicing the present invention, the ceramic body of the present invention need not be of the honeycomb type, as is illustrated in FIG. 1.

The inter-passage channels 26 are arranged between adjacent ones of the second set of passages 24 and proximate selected ones of the opposite passage ends 24A, 24B. The second set of passages 24, the input port 28, the output port 29, the inter-passage channels 26, and the end plates 16 are arranged to define a flow path extending from the input port 28, through the second set of passages 24 and the interpassage channels 26, to the output port 29. In the illustrated embodiment, the interpassage channels 26 in adjacent ones of the second set of passages 24 are defined at opposite end faces 21, 23 of the ceramic body 20. In this manner, the inter-passage channels 26 are arranged such that the flow path reverses direction following passage through the inter-passage channels. A turbulence inducing insert 25, e.g., a turbulence mesh, is arranged in the passages 22, 24 to improve device efficiency by eliminating laminar flow within the passages 22, 24.

Figure 2:
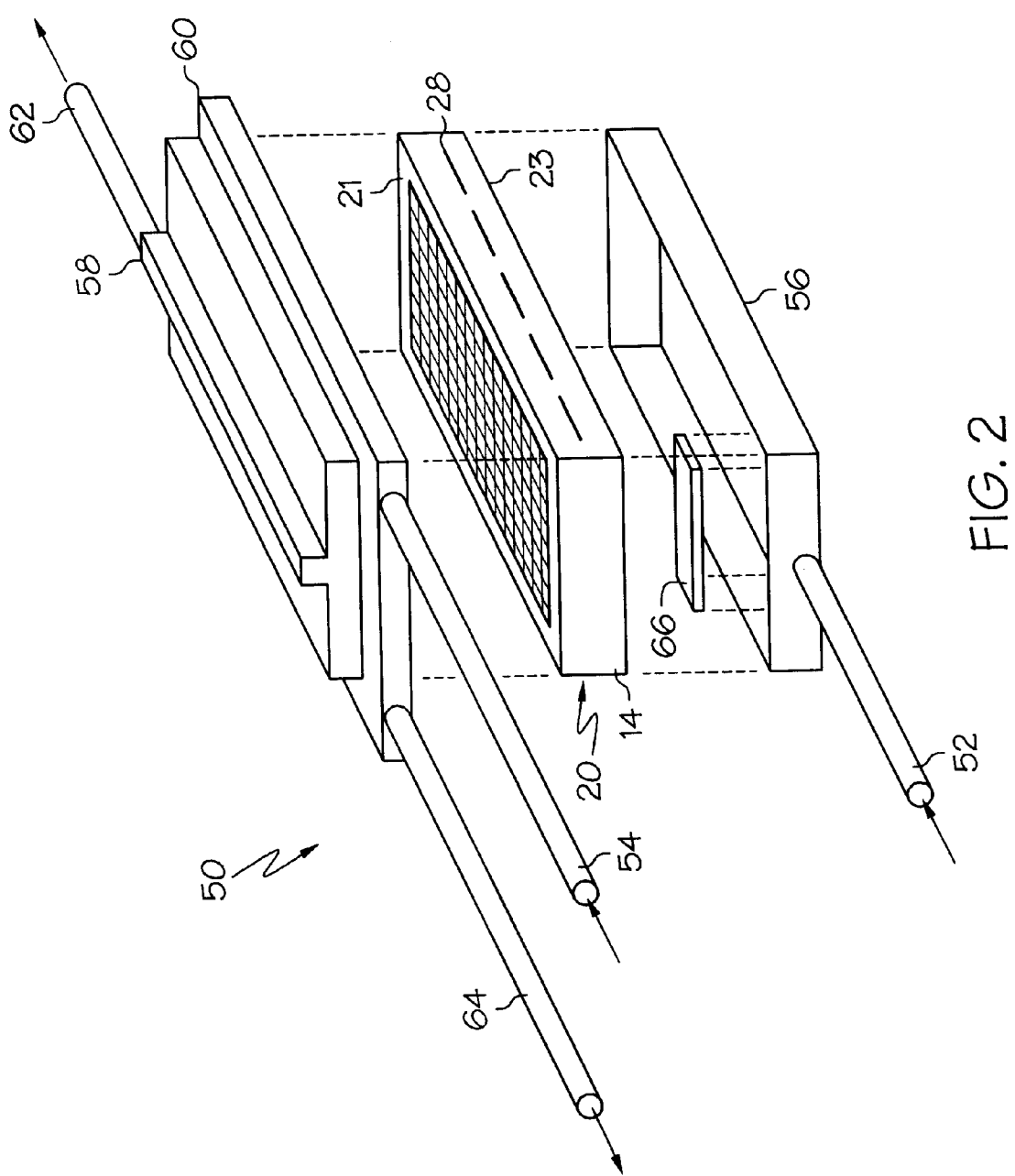
FIG. 2 is an exploded schematic three-dimensional view of a ceramic fuel cell and manifold assembly according to the present invention.
Figure 3:
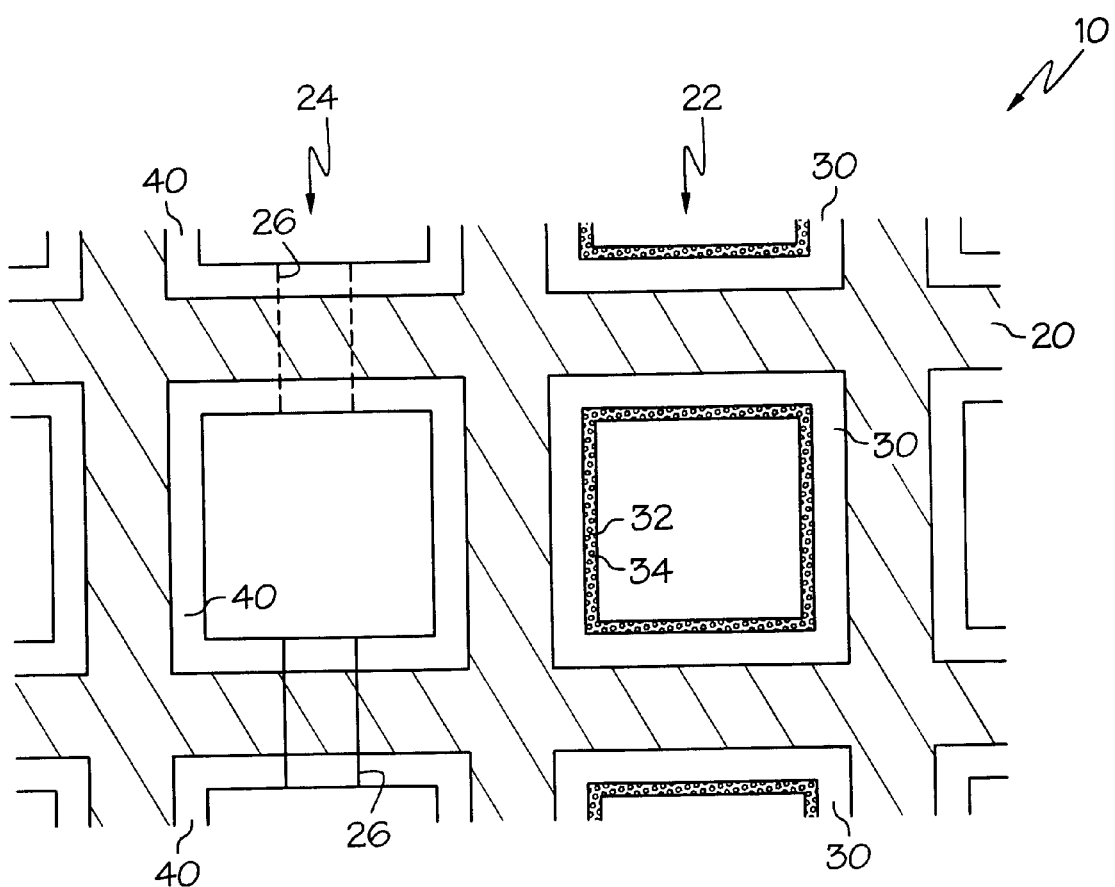
FIG. 3 is a schematic cross-sectional illustration of selected portions of a ceramic fuel cell according to the present invention.
Figure 4:
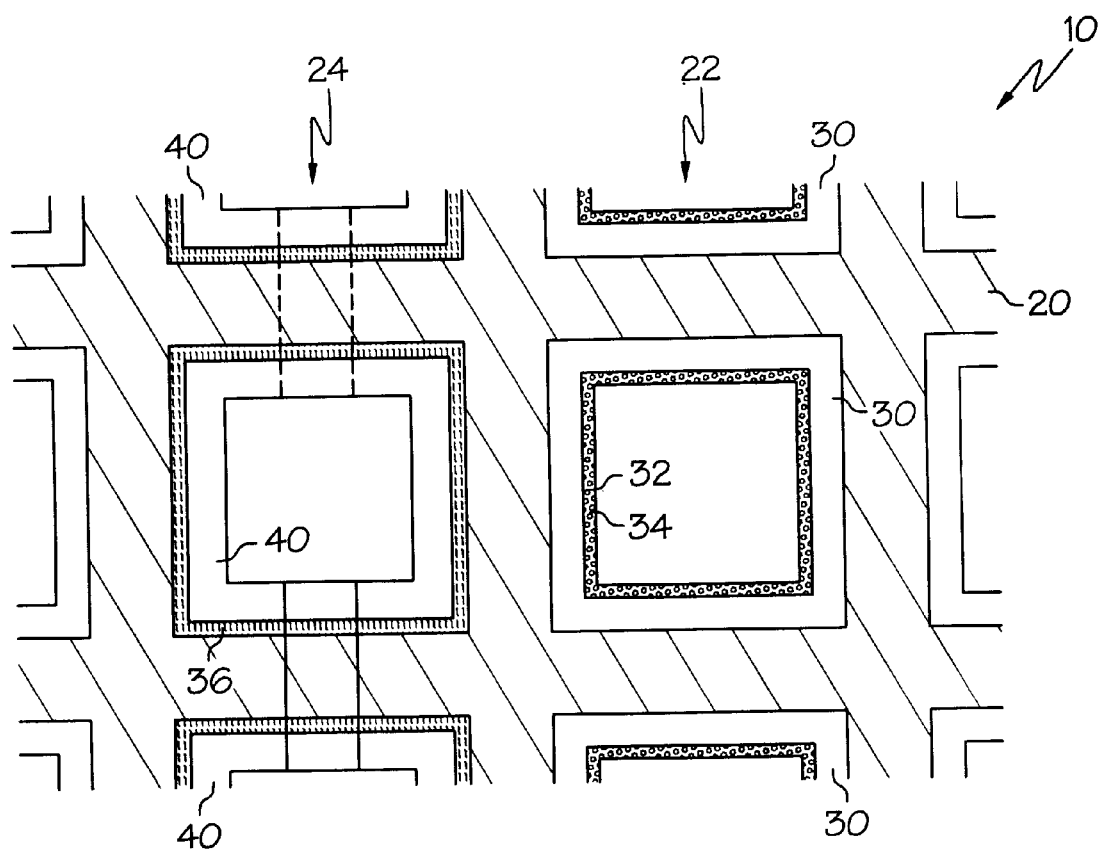
FIG. 4 is a schematic cross-sectional illustration of selected portions of an alternative ceramic fuel cell according to the present invention.

Respective first electrodes 30 are disposed in the first set of passages 22 and respective second electrodes 40 are disposed in the second set of passages 24 (see FIGS. 3 and 4). If the first set of passages 22 are coupled to an oxidant supply line 52 of a manifold assembly 50, described in detail below with reference to FIG. 2, and the input port 28 is coupled to a fuel supply line 54 of the manifold assembly 50, the respective first electrodes 30 will function as cathode electrodes and the respective second electrodes 40 will function as anode electrodes. Alternatively, if the first set of passages are coupled to a fuel supply and the input port is coupled to an oxidant supply, the respective first electrodes will function as anode electrodes and the respective second electrodes will function as cathode electrodes.

A manifold assembly 50 according to the present invention is illustrated in FIG. 2. The manifold assembly 50 defines the oxidant supply line or first manifold input 52, the fuel supply line or second manifold input 54, an input manifold 56, an output manifold 58, and a side face manifold 60. As is noted above, it is contemplated by the present invention that the oxidant supply line 52 and the fuel supply line 54 may be switched, one for the other, such that their arrangement would be the opposite of that indicated in FIG. 2.

The input manifold 56 is coupled to a first end face 23 of the ceramic body 20 such that the first manifold input 52 is in communication with the first set of passages 22. Similarly, the output manifold 58 is coupled to the opposite end face 21 of the ceramic body 20 such that a first manifold output 62 defined by the output manifold 58 is also in communication with the first set of passages 22. In this manner, gas from a gas supply may pass from the first manifold input 52, through the first set of passages 22, and out the first manifold output 62.

The side face manifold 60 is coupled to opposite port faces 27 of the ceramic body 20. The coupling is such that the side face manifold 60 defines the second manifold input 54 in communication with the input port 28 of the ceramic body 20 and a second manifold output 64 in communication with the output port 29 of the ceramic body 20. Preferably, the side face manifold 60 and the output manifold 58 comprise a unitary manifold assembly. A heating element 66 is provided to bring the fuel cell 10 to a suitable operating temperature.

As is illustrated in FIG. 2, the input manifold 56 is arranged such that its interior space communicates directly with only the open passages at the first end face 23. Similarly, the output manifold 58 is arranged such that its interior space communicates directly with only the open passages at the second end face 21. Finally, the side face manifold 60 is arranged such that the second manifold input 54 communicates directly only with the input port 28 and such that the second manifold output 56 communicates directly only with the output port 29. The opposite ends 24A, 24B of the second set of passages 24 are sealed closed with the end plates 16 formed from a composition characterized by a mixture of glasses available from Vitrifunctions, Inc. of Pittsburgh, Pa., under the product codes 2012 and 572. The particular proportions of each glass component are selected to yield a composition having a coefficient of thermal expansion matching the coefficient of thermal expansion of the ceramic body 20. The input manifold 56, the output manifold 58, and the side face manifold 60 are also sealed with the above-described mixture of glasses. The input manifold 56, the output manifold 58, and the side face manifold 60 are constructed from a metal alloy, e.g., an Inconel® alloy or an SS-430 stainless steel.

Referring now specifically to FIGS. 3 and 4, a schematic cross-sectional illustration of a ceramic fuel cell 10 according to the present invention is presented. The first set of passages 22 referred to above with reference to FIG. 1, are identified in FIGS. 3 and 4 as oxidant supply passages 22. The second set passages 24 referred to above with reference to FIG. 1, are identified in FIGS. 3 and 4 as fuel supply passages 24. The first electrodes 30 comprise cathode electrodes because they are disposed in the oxidant supply passages 22 and the second electrodes 40 comprise anode electrodes because they are disposed in the fuel supply passages 24.

In the embodiment of FIG. 3, the oxygen ion conductive ceramic body 20 is composed of a niobia stabilized bismuth oxide oxygen ion conductive ceramic comprising x mole % $Bi_2O_3$, y mole % $Nb_2O_5$, and z mole % $ZrO_2$. Preferably, x is a value from about 80 to about 90 and y is a value from about 10 to about 20. Although the niobia stabilized bismuth oxide ceramic may also be used with unreformed natural gas or methane fuel supplies, the ceramic is particularly well-suited for use with hydrogen fuel supplies because it is resistant to hydrogen reduction, as long as a minimal electrical current flow is maintained in the ceramic body 20 between the cathode electrodes 30 and the anode electrodes 40. For the niobia stabilized bismuth oxide ceramic fuel cell of FIG. 3, the cathode electrodes 30 typically comprise a ceramic electrode with the silver overlay 32 described in detail below. The anode electrodes 40 typically comprise copper cermet electrodes, also described in detail below.

In the embodiment of FIG. 4, the oxygen ion conductive ceramic body 20 is composed of an yttria stabilized bismuth oxide oxygen ion conductive ceramic. Preferably, the yttria stabilized ceramic comprises x mole % $Bi_2O_3$, y mole % $Y_2O_3$, and z mole % $ZrO_2$, where x is a value from about 70 to about 80, y is a value from about 20 to about 30, and z is a value from about 1 to about 5. This ceramic composition is also operational at temperatures at or below about 650° C. Thus, sooting of the ceramic body 20 is not a problem if fuels such as methane and natural gas are utilized in the present invention. Further, the yttria stabilized bismuth oxide oxygen ion conductive ceramic exhibits significant phase stability under typical operating conditions in natural gas or methane.

For the yttria stabilized bismuth oxide ceramic fuel cell of FIG. 3, the cathode electrodes 30 typically comprise a ceramic electrode with the silver overlay 32, as described in detail below. The anode electrodes 40 typically comprise copper cermet electrodes, also described in detail below. The anode electrodes 40 may also comprise a ceramic electrode with the silver overlay 32, unless hydrogen is to be utilized as the fuel supply. In some embodiments of the present invention a zirconia coating 36 is interposed between the yttria stabilized ceramic body 20 and the anode electrode 40, particularly where hydrogen is utilized as the fuel supply.

A silver layer 32 is disposed over the cathode electrodes 30 and may also be disposed over the anode electrodes 40 to reduce the resistivity of these electrodes. It is noted, however, that a silver overlay anode electrode 40 is not preferred where hydrogen is utilized as the fuel supply. In specific embodiments of the present invention, the silver layer 32 further comprises a glass 34 mixed therein. The glass 34 is selected so as to enhance adhesion of the silver layer 32 to the underlying electrode. A silver paste incorporating a suitable glass composition for forming the silver layer is available from Electroscience Laboratories, Inc. under the product number 9901.

The copper cermet electrode composition referred to above comprises a mixture of powders of CuO and a niobia stabilized bismuth oxide ceramic. Alternatively, the copper cermet may comprise a mixture of powders of CuO and a zirconia powder. These copper cermet compositions are well suited for use with the yttria stabilized ceramic body 20 because they sinter at lower temperatures than the yttria stabilized ceramic. The respective powder ratios for formation of the copper cermet electrode are selected such that the resulting composition, upon reduction, comprises at least 35% by volume Cu. According to certain embodiments of the present invention, the zirconia coating 36 interposed between the yttria stabilized ceramic body 20 and the anode electrode 40 may be removed, particularly where the anode electrode composition comprises a copper cermet.

Another example of a suitable ceramic electrode composition according to the present invention is characterized by the conductive ceramic composition LXM, where L is lanthanum (La), M is manganate ($MnO_3$), and X is most preferably lead (Pb) or, alternatively, a component selected from strontium (Sr), Calcium (Ca), and Barium (Ba). This ceramic electrode is particularly well-suited for use with the silver overlay 32 illustrated in FIGS. 3 and 4.

Having described the invention in detail and by reference to preferred embodiments thereof, it will be apparent that modifications and variations are possible without departing from the scope of the invention defined in the appended claims.

What is claimed is:

1. A ceramic fuel cell comprising:
   an oxidant supply passage;
   a cathode electrode disposed in said oxidant supply passage;
   a fuel supply passage;
   an anode electrode disposed in said fuel supply passage; and
   an yttria stabilized bismuth oxide oxygen ion conductive ceramic interposed between said cathode electrode and said anode electrode wherein said yttria stabilized ceramic comprises $ZrO_2$, wherein a ceramic electrode material defines at least one of said cathode electrode and said anode electrode, and wherein said ceramic electrode material is characterized by the ceramic composition LXM, where L is lanthanum (La), M is manganate ($MnO_3$), and X is lead (Pb).

2. A ceramic fuel cell as claimed in claim 1 wherein said yttria stabilized ceramic comprises x mole % Bi2O3 y mole % Y2O3, and z mole % ZrO2, wherein x is a value from about 70 to about 80, y is a value from about 20 to about 30, and z is a value from about 1 to about 5.

3. A ceramic fuel cell as claimed in claim 1 further comprising a zirconia coating interposed between said yttria stabilized ceramic and said anode electrode.

4. A ceramic fuel cell as claimed in claim 1 further comprising a silver layer disposed over said ceramic electrode material.

5. A ceramic fuel cell as claimed in claim 4 wherein said silver layer further comprises a glass mixed therein, wherein said glass is selected so as to enhance adhesion of said silver layer to said ceramic electrode material.

6. A ceramic fuel cell comprising:
   an oxidant supply passage;
   a cathode electrode disposed in said oxidant supply passage;
   a fuel supply passage;
   an anode electrode disposed in said fuel supply passage; and
   an yttria stabilized bismuth oxide oxygen ion conductive ceramic interposed between said cathode electrode and said anode electrode wherein said yttria stabilized ceramic comprises $ZrO_2$, wherein said anode electrode comprises a copper cermet and said copper cermet electrode defines a cermet composition characterized by a sintering temperature that is lower than a sintering temperature characterizing said yttria stabilized bismuth oxide oxygen ion conductive ceramic.

7. A ceramic fuel cell as claimed in claim 6 wherein said copper cermet comprises a mixture of powders of CuO and a bismuth oxide ceramic.

8. A ceramic fuel cell comprising:
   an oxidant supply passage;
   a cathode electrode disposed in said oxidant supply passage;
   a fuel supply passage;
   an anode electrode disposed in said fuel supply passage; and
   a niobia stabilized bismuth oxide oxygen ion conductive ceramic interposed between said cathode electrode and said anode electrode, wherein a ceramic electrode material defines at least one of said cathode electrode and said anode electrode, and wherein said ceramic electrode material is characterized by the ceramic composition LXM, where L is lanthanum (La), M is manganate ($MnO_3$), and X is lead (Pb).

9. A ceramic fuel cell as claimed in claim 8 wherein said niobia stabilized ceramic comprises x mole % Bi2O3 and y mole % Nb2O5, wherein x is a value from about 80 to about 90, and wherein y is a value from about 10 to about 20.

10. A ceramic fuel cell as claimed in claim 8 further comprising a silver layer disposed over said ceramic electrode material.

11. A ceramic fuel cell as claimed in claim 10 wherein said silver layer further comprises a glass mixed therein, wherein said glass is selected so as to enhance adhesion of said silver layer to said ceramic electrode material.

12. A ceramic fuel cell comprising:
   an oxidant supply passage;
   a cathode electrode disposed in said oxidant supply passage;
   a fuel supply passage;
   an anode electrode disposed in said fuel supply passage; and
   a niobia stabilized bismuth oxide oxygen ion conductive ceramic interposed between said cathode electrode and said anode electrode, wherein said anode electrode comprises a copper cermet and said copper cermet electrode defines a cermet composition characterized by a sintering temperature that is lower than a sintering temperature characterizing said niobia stabilized bismuth oxide oxygen ion conductive ceramic.

13. A ceramic fuel cell as claimed in claim 12 wherein said copper cermet comprises a mixture of powders of CuO and a bismuth oxide ceramic.

14. A ceramic fuel cell as claimed in claim 13 wherein said bismuth oxide ceramic comprises a niobia stabilized bismuth oxide oxygen ion conductive ceramic.

15. A ceramic fuel cell comprising:
   an oxidant supply passage;
   a cathode electrode disposed in said oxidant supply passage;
   a fuel supply passage;
   a copper cermet anode electrode disposed in said fuel supply passage; and
   an yttria stabilized bismuth oxide oxygen ion conductive ceramic interposed between said cathode electrode and said copper cermet anode electrode, wherein said copper cermet electrode defines a cermet composition characterized by a sintering temperature that is lower than a sintering temperature characterizing said yttria stabilized bismuth oxide oxygen ion conductive ceramic.

16. A ceramic fuel cell as claimed in claim 15 wherein said copper cermet anode electrode comprises a mixture of powders of CuO and a bismuth oxide ceramic.

17. A ceramic fuel cell as claimed in claim 16 wherein said bismuth oxide ceramic comprises a niobia stabilized bismuth oxide oxygen ion conductive ceramic.

18. A ceramic fuel cell as claimed in claim 16 wherein said bismuth oxide ceramic comprises an yttria stabilized bismuth oxide oxygen ion conductive ceramic.

19. A ceramic fuel cell as claimed in claim 15 wherein said cathode electrode comprises a ceramic electrode material characterized by a ceramic composition LXM, where L is lanthanum (La), M is manganate (MnO3), and X is lead (Pb).

20. A ceramic fuel cell as claimed in claim 19 wherein said cathode electrode further comprises a silver layer disposed between said ceramic composition and said oxidant supply passage.

21. A ceramic fuel cell as claimed in claim 20 wherein said silver layer further comprises a glass mixed therein, wherein said glass is selected so as to enhance adhesion of said silver layer to said ceramic composition.

22. A ceramic fuel cell as claimed in claim 15 wherein said oxygen ion conductive ceramic comprises:
an oxygen ion conductive ceramic body defining said oxidant supply passage and said fuel supply passage in the form of first and second sets of substantially parallel passages respectively, wherein
each of said passages defines opposite passage ends,
said opposite ends of said first set of passages are open,
said opposite ends of said second set of passages are closed,
said second set of passages include inter-passage channels formed in said ceramic body between adjacent ones of said second set of passages, and
said inter-passage channels are arranged proximate selected ones of said opposite passage ends; and
an input port and an output port coupled to said second set of passages, wherein said second set of passages, said input port, said output port, and said inter-passage channels are arranged to define a flow path extending from said input port, through said second set of passages and said inter-passage channels, to said output port.

23. A ceramic fuel cell as claimed in claim 22 wherein said inter-passage channels are arranged such that said flow path reverses direction following passage through said inter-passage channels.

24. A ceramic fuel cell as claimed in claim 22 wherein said inter-passage channels are defined at an end face of said ceramic body.

25. A ceramic fuel cell as claimed in claim 22 wherein inter-passage channels in adjacent ones of said second set of passages are defined at opposite end faces of said ceramic body.

26. A ceramic fuel cell as claimed in claim 15 wherein said ceramic fuel cell comprises a honeycomb ceramic body defining a plurality of oxygen supply passages and fuel supply passages.

27. A ceramic fuel cell as claimed in claim 26 wherein said honeycomb ceramic body comprises an extruded multicellular ceramic structure.

28. A ceramic fuel cell comprising:
an oxidant supply passage;
a cathode electrode disposed in said oxidant supply passage;
a fuel supply passage;
an anode electrode disposed in said fuel supply passage; and
an oxygen-ion conductive ceramic interposed between said cathode electrode and said anode electrode wherein ceramic comprises x mole % Bi2O3, y mole % Y2O3, and z mole % ZrO2, wherein x, y, and z comprise values selected such that said ceramic is operational as an oxygen-ion conductive ceramic at temperatures at or below about 650° C., whereby sooting of said ceramic in the presence of methane or natural gas in said fuel supply passage is avoided.

29. A ceramic fuel cell as claimed in claim 28 wherein said oxygen ion conductive ceramic comprises:
an oxygen ion conductive ceramic body defining said oxidant supply passage and said fuel supply passage in the form of first and second sets of substantially parallel passages, wherein
each of said passages defines opposite passage ends,
said opposite ends of said first set of passages are open,
said opposite ends of said second set of passages are closed,
said second set of passages include inter-passage channels formed in said ceramic body between adjacent ones of said second set of passages, and
said inter-passage channels are arranged proximate selected ones of said opposite passage ends; and
an input port and an output port coupled to said second set of passages, wherein said second set of passages, said input port, said output port, and said inter-passage channels are arranged to define a flow path extending from said input port, through said second set of passages and said inter-passage channels, to said output port.

30. A ceramic fuel cell as claimed in claim 29 wherein said inter-passage channels are arranged such that said flow path reverses direction following passage through said inter-passage channels.

31. A ceramic fuel cell as claimed in claim 29 wherein said inter-passage channels are defined at an end face of said ceramic body.

32. A ceramic fuel cell as claimed in claim 29 wherein inter-passage channels in adjacent ones of said second set of passages are defined at opposite end faces of said ceramic body.

33. A ceramic fuel cell as claimed in claim 28 wherein said ceramic fuel cell comprises a honeycomb ceramic body defining a plurality of oxygen supply passages and fuel supply passages.

34. A ceramic fuel cell as claimed in claim 33 wherein said honeycomb ceramic body comprises an extruded multicellular ceramic structure.

35. A ceramic fuel cell comprising:
an oxidant supply passage;
a cathode electrode disposed in said oxidant supply passage;
a fuel supply passage;
an anode electrode disposed in said fuel supply passage; and
an oxygen-ion conductive ceramic interposed between said cathode electrode and said anode electrode wherein ceramic comprises x mole % $Bi_2O_3$ and y mole % $Nb_2O_5$, wherein x, y, and z comprise values selected such that said ceramic is resistant to hydrogen reduction, whereby reduction of said ceramic in the presence of hydrogen in said fuel supply passage is avoided.

36. A ceramic fuel cell as claimed in claim 35 wherein:

said oxygen ion conductive ceramic is arranged to define a plurality of oxidant supply passages and a plurality of fuel supply passages, said oxidant supply passages are oriented substantially parallel to said fuel supply passages, and selected ones of said oxidant supply passages are defined so as to be adjacent to corresponding ones of said fuel supply passages.

37. A ceramic fuel cell as claimed in claim 35 wherein:

said ceramic fuel cell comprises a plurality of oxidant supply passages and a plurality of fuel supply passages;

said oxygen ion conductive ceramic is arranged to define a plurality of substantially parallel longitudinal channels; and selected ones of said longitudinal channels define said oxidant supply passages and remaining ones of said longitudinal channels define said fuel supply passages.

38. A ceramic fuel cell as claimed in claim 35 wherein said oxygen ion conductive ceramic comprises:

an oxygen ion conductive ceramic body defining said oxidant supply passage and said fuel supply passage in the form of first and second sets of substantially parallel passages respectively, wherein each of said passages defines opposite passage ends,
said opposite ends of said first set of passages are open,
said opposite ends of said second set of passages are closed, said second set of passages include inter-passage channels formed in said ceramic body between adjacent ones of said second set of passages, and said inter-passage channels are arranged proximate selected ones of said opposite passage ends; and an input port and an output port coupled to said second set of passages, wherein said second set of passages, said input port, said output port, and said inter-passage channels are arranged to define a flow path extending from said input port, through said second set of passages and said inter-passage channels, to said output port.

39. A ceramic fuel cell as claimed in claim 38 wherein said inter-passage channels are arranged such that said flow path reverses direction following passage through said inter-passage channels.

40. A ceramic fuel cell as claimed in claim 39 wherein said inter-passage channels are defined at an end face of said ceramic body.

41. A ceramic fuel cell as claimed in claim 40 wherein inter-passage channels in adjacent ones of said second set of passages are defined at opposite end faces of said ceramic body.

42. A ceramic fuel cell as claimed in claim 35 wherein said ceramic fuel cell comprises a honeycomb ceramic body defining a plurality of oxygen supply passages and fuel supply passages.

43. A ceramic fuel cell as claimed in claim 42 wherein said honeycomb ceramic body comprises an extruded multicellular ceramic structure.

* * * * *